(12) United States Patent
Uang et al.

(10) Patent No.: US 7,174,175 B2
(45) Date of Patent: Feb. 6, 2007

(54) METHOD TO SOLVE THE MULTI-PATH AND TO IMPLEMENT THE ROAMING FUNCTION

(75) Inventors: Chun-Chu Uang, Tainan (TW);
Wei-Chih Lin, Tainan (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 91 days.

(21) Appl. No.: 10/684,096

(22) Filed: Oct. 10, 2003

(65) Prior Publication Data

US 2005/0079893 A1 Apr. 14, 2005

(51) Int. Cl.
*H04Q 7/20* (2006.01)

(52) U.S. Cl. ................ 455/462; 455/426.2; 455/554.1; 455/554.2; 455/555; 455/561; 455/562.1; 455/633; 455/411; 455/437; 455/446

(58) Field of Classification Search ............... 455/63.3, 455/411, 437, 446, 452.2, 463, 555, 426.2, 455/554.1, 554.2, 561, 562.1, 462; 370/332, 370/336; 343/711–714; 52/220.1–220.8
See application file for complete search history.

(56) References Cited

U.S. PATENT DOCUMENTS

| | | | | |
|---|---|---|---|---|
| 5,276,277 A | * | 1/1994 | Hightower et al. | .... 174/35 MS |
| 5,349,631 A | * | 9/1994 | Lee | ............ 455/463 |
| 5,459,727 A | * | 10/1995 | Vannucci | ..................... 370/332 |
| 5,633,873 A | * | 5/1997 | Kay et al. | .................... 370/336 |
| 5,815,114 A | * | 9/1998 | Speasl et al. | .......... 342/357.06 |
| 6,023,621 A | * | 2/2000 | Jackson et al. | ........... 455/452.2 |
| 6,070,071 A | * | 5/2000 | Chavez et al. | ............ 455/422.1 |
| 6,112,088 A | * | 8/2000 | Haartsen | ..................... 455/437 |
| 6,223,055 B1 | * | 4/2001 | Cyr | ............................ 455/555 |
| 6,317,089 B1 | * | 11/2001 | Wilson et al. | .............. 343/713 |
| 6,351,463 B1 | * | 2/2002 | DeSantis et al. | ............ 370/350 |
| 6,370,356 B2 | * | 4/2002 | Duplessis et al. | .......... 455/63.3 |
| 6,405,018 B1 | * | 6/2002 | Reudink et al. | .............. 455/20 |
| 6,449,477 B1 | * | 9/2002 | Weissman | ................ 455/422.1 |
| 6,535,730 B1 | * | 3/2003 | Chow et al. | ................. 455/416 |
| 6,643,504 B1 | * | 11/2003 | Chow et al. | ................. 455/411 |
| 2002/0006799 A1 | * | 1/2002 | Rappaport et al. | .......... 455/446 |
| 2003/0097806 A1 | * | 5/2003 | Brown | ....................... 52/220.1 |

* cited by examiner

*Primary Examiner*—Steve M. D'Agosta
(74) *Attorney, Agent, or Firm*—Tung & Associates

(57) ABSTRACT

A telecommunication system intended for providing telecommunication services at a semiconductor manufacturing plant under the circumstances of shielded areas of clean rooms comprises a GSM base station installed at the plant and equipped with a plurality of low power antennas, a private branch exchange and at least two dedicated lines of E1 type connecting the base station and the PBX to a public switched telephone network. Software incorporated in the base station and PBX allows for telecommunication connections set up at the plant to use abbreviated four-digit numbers for both wireless mobile stations and wired stations, while keeping the possibility to reach a mobile station, even if it is outside the plant at the time of the connection, dialing the abbreviated four-digit number.

16 Claims, 1 Drawing Sheet

METHOD TO SOLVE THE MULTI-PATH AND TO IMPLEMENT THE ROAMING FUNCTION

BACKGROUND INFORMATION

1. Field of the Invention

The present invention relates generally to telecommunications and more particularly to a business mobile telephone communication system that can be equally successfully used indoors and outdoors in circumstances where the indoor communication takes place in a plant such a semiconductor manufacturing plant.

2. Description of the Related Art

Providing dependable telephone service in industrial environment is of paramount importance and directly affects efficiency of an industry. Currently known for the use for communication needs at semiconductor plants are DECT (Digital European Cordless Telecommunication) system and PHP (Personal Handy Phone) system, also known as PHS. DECT, based on a microcellular radio communication system, represents a wireless standard based on time division multiple access (TDMA). It is employed for limited-range (up to several hundred meters) wireless services. The system uses advanced TDMA technology and frequency range of 1880–1900 MHz. Two basic parts of the system are mobile handsets and fixed base stations. Transmitting bursts of data in the defined time slots provides a connection. Duplex operation uses a pair of evenly spaced slots, one for transmitting and the other for receiving. However, DECT phones cannot be successfully employed at a semiconductor plant. The reason for that will be explained below in more detail.

PHS, first launched in 1995, is a second-generation cordless telephone system proposed as a successor to the conventional analog cordless telephones. It is a full duplex wireless communication system of a micro-cell architecture using 1.9 GHz frequency band. PHS can be applied to a public mobile communication system, or to a Wireless Local Loop (WLL) that substitutes the existing telephone twisted pair to provide subscribers with telephone services, or to a wireless PBX or a cordless telephone system, or to transceivers that enable personal stations (PSs) to communicate with each other. PHS can implement a high quality voice equivalent to that of existing wired telephone through the employment of 32 kbps ADPCM voice coding. It has long standby and talk time because PHS cells cover a very small area, meaning the cells and personal stations consume low amounts of power. The system employs advanced encryption technology. Initially, it could not be employed when a user moved from one cell to another since it lacked a cell-handoff. Current versions of the PHS handsets overcame this drawback.

Specificity of some industrial products, processes and the conditions under which they are realized is such that it can adversely affect quality of telecommunication service. Clean rooms in semiconductor plants may present an example of this type of environment. Semiconductor devices are manufactured, as is well known, within a clean room having installed various manufacturing apparatuses used in various manufacturing processes (wet process, dry process, oxidation, lithography, ion implantation, etc.) and measuring apparatuses used for various measuring processes in testing for quality control. Clean rooms are used mainly in semiconductor device manufacturing facilities to improve yield by reducing contamination due to causes such as airborne particles. The maximum particle count permissible in such clean rooms must meet very exacting requirements, and much effort is devoted to that end, including the use of a highly filtered airflow through the room and the use of a pressure differential between the room and the ambient. Typically, filtered air enters the room through ceiling registers and exits through perforated floor panels forming a part of a raised (double) floor. The panels sit on adjustable height posts. The floor typically uses some perforated and some solid panels. Dampers or some other means can be used to regulate airflow. For example, a perforated panel can use a double layer of perforated sheet, and a movable register can be mounted between the two sheets to regulate airflow.

Quality of telephone communications from/to a clean room can be compromised by metal inclusions in floor panel and wall structures. Pipe frames in panels are welded at the corners, on top of which is also welded, e.g. tack welded, a perforated metal sheet. Inside the frame, parallel to two of its sides, rectangular or L-shape cross bars are welded at their end to the other two sides and to the perforated sheet metal above. Together with metal structured walls, a typical clean room thus represents a shield for electromagnetic waves and thus poses a serious problem for incoming and outgoing wireless communications using DECT or PHS.

Stable communication cannot be provided because of a multi-path resulting in signal fading—a signal degradation that occurs when multiple copies of the same radio signal arrive at the receiver through different reflected paths. The interference of these signals, each having traveled a different distance, leads to phase and amplitude variations.

A specific manifestation of multipath fading called Raley fading arises from the ensemble of reflected signals arriving at the receiver antenna and creating standing waves. From the transmitting antenna, even a tightly focused radio signal scatters, or spreads out. The ground and bodies of water reflect the signal back upward, and the atmosphere reflects the signal downward. At the receiver, portions of the signal arrive at different times, as the signal has taken multiple paths of differing path lengths from transmitter to receiver. Occasionally, the aggregate signal from the indirect paths can be of similar strength to the signal from the direct path. If the two signals are of opposite phase, a standing wave is created, and the signal fades in overall strength. The ultimate impact is that of increased transmission errors. The radio signal processing in both the base station and mobile units have to be designed to tolerate a certain level of multipath fading. One of the examples where poor quality of telecommunications especially matters and is specifically sensitive is when processing tools and equipment are not placed in the clean room area yet, and low telecommunication efficiency slows down the tool move. By and large, it reduces flexibility customarily provided by mobile telecommunication.

SUMMARY OF THE INVENTION

There is a need for a wireless telecommunication system that can reliably work under the restrictions imposed by semiconductor manufacturing plant clean rooms.

According to the present invention, the problem of improving quality of telecommunication service in clean room areas of a semiconductor production plant is addressed by providing a Global System Mobile base station at the plant and providing dedicated lines to connect a private branch exchange with the base station.

A business telecommunication system capable of connecting wireless mobile stations and wired stations located at a plant comprises a base station at the plant, to which said wireless mobile stations are connected, a private branch exchange at the plant, to which said wired stations are connected, at least two dedicated lines, one line of these dedicated lines connecting the base station with a public switched telephone network, and another dedicated line connecting the public switched telephone network with the private branch exchange, and a plurality of low power antennas associated with the base station to connect the wireless mobile stations to the base station.

Thanks to that, a multipath can be eliminated, and reliable communication can be attained in circumstances of shielded areas of clean rooms at the plant.

Software means are incorporated in the base station and the private branch exchange for creating a unique full network number for any of the wireless mobile and wired stations, whereby a connection between the wireless mobile stations and between one of the wireless mobile station and one of the wired stations, no matter whether the wireless mobile stations are at the plant at the moment of establishing the connection, can be set up by using their abbreviated intraplant numbers.

BRIEF DESCRIPTION OF THE DRAWING

The above objects and advantages of the present invention will become more apparent from an ensuing description of a preferred embodiment thereof with reference to the attached drawings, in which.

DESCRIPTION OF THE PREFERRED EMBODIMENT

The present invention is now described with reference to the drawings. In the following description, for purposes of explanation, numerous specific details are set forth in order to provide a thorough understanding of the present invention. It may be evident to one skilled in the art that the present invention may be practiced without these specific details or with their equivalents. In other instances, well-known structures and devices are shown in block diagram form in order to facilitate description of the present invention.

Figure 1:
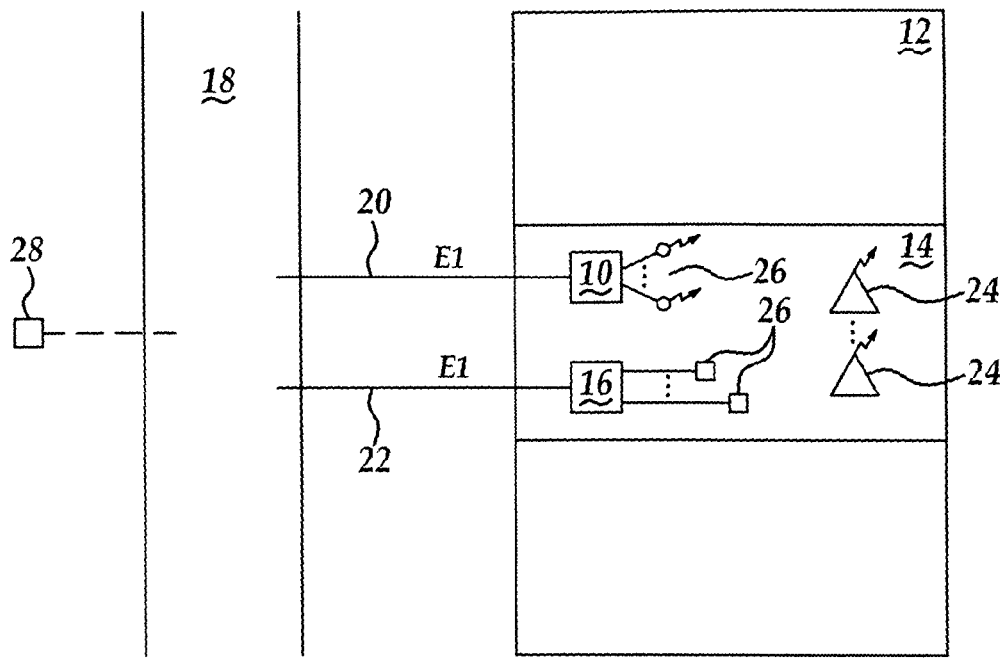
FIG. 1 is a block diagram of a telecommunication system illustrating the present invention.

The architecture of the telecommunication system provided in accordance with the present invention is presented in FIG. 1. The main concept of the invention is installing a Global System Mobile type Base Station at the plant, preferably in a Telecom Room; and providing two sets of dedicated lines of the E1 type, one set connecting the base station with the public switched telephone network and the other connecting the public switched telephone network with a private branch exchange at the plant. The base station generally shown as a block 10, which includes for simplicity not only the base station itself but also interface equipment associated therewith such as transceiver (transmitter and receiver), repeater, etc., is installed at the plant 12, preferably at the floor 14 where the clean area is located. The base station 10 may be, for example, of the Ericsson RBS 2205 type.

The design power for the GSM Base Station is preferably 20 W (43 dBm). It may use low power two in-door omni 360° antennas working for up to 10 m, and up to eight 80° panel antennas working for up to 40 m. Power of the GSM Base Station Antenna Transmitter is preferably 10 W (40 dBm), cable loss being −3 dBm. Sensitivity of a service antenna receiver is about $10^{-5}$ mW (−50 dBm), with a free space path loss being −90 dBm. Maximum output power of a repeater is preferably 1 W (30 dBm) made up of −50 dBm for the source antenna receiver, +8 dBm for source antenna amplification, −3 dBm for cable loss, and +75 dBm for the amplifier. The service antenna transmitter has output power of about 0.25 W (24 dBm) made up of 24 dBm for adjusted output power of the repeater, −5 dBm for one-to-two splitter loss, −3 dBm for cable loss, and +8 dBm for service antenna amplification.

A Global System Mobile Base Station 10 provided, according to the present invention, at the plant 12, preferably in a Telecom Room 14, uses ETSI (European Telecommunications Standards Institute) standards and two frequency bands: 1710–1785 MHz for outgoing channels (UL, for uplink) and 1805–1880 MHz for incoming channels (DL, for downlink). The number of carriers provided by the system is 374, the carrier separation being 200 kHz. The air-interface for both uplink and downlink has same path loss that can be calculated according to the following formula which is a simplified form of a Keenan-Motley model for 1800 MHz:

$$L_p=37.5+20\ \log(D)+N_w W$$

where $L_p$ is a path loss in dB between an in-building antenna and a mobile station (MS), D—transmitter-receiver separation (m), $N_w$—number of walls passed by a direct ray, and W—wall attenuation factor (dB).

For example, in free space, a body loss of 5 dB is not supposed to be considered;

In 1 m, $L_p$=37.5+20 log(1)+0=37.5 dB

In 2 m, $L_p$=37.5+20 log(2)+0=43.5 dB

In 3 m, $L_p$=37.5+20 log(3)+0=47 dB

With a MS transmit power of 0.65 W (24 dBm), 24 dB−37.5 dB=−13.5 dB receiver SS in 1 m border 24 dB−43.5 dB=−19.5 dB receiver SS in 2 m border, and 24 dB−47 dB=−23 dB receiver SS in 3 m border.

Rate per channel when using GSM is 270 kb/s (9.6 now); frame time is 4.613 ms, the number of slots per frame being eight. The system's mobility is less than 200 km/h, base station power is 20 W, and handset power is 1 W or 0.25 W when switched to lower power consumption mode.

Figure 2:
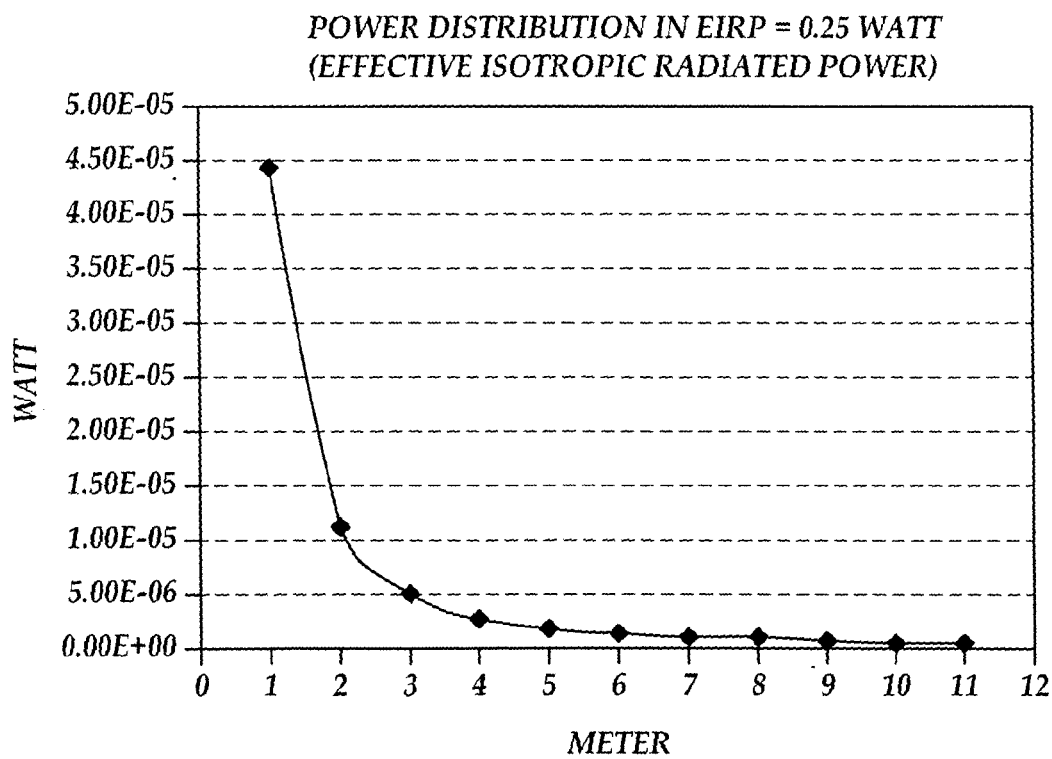
FIG. 2 illustrates power distribution depending on distance for a GSM 1800 system.

The average RF power in the air is much lower than the maximum output power of the handset or an in-door antenna because of path loss of RF waves and power control of the handset and base station transceiver BTS. FIG. 2 shows power distribution for the GSM 1800 system according to the Keenan-Motley model on the assumption that the output power of the handset and antenna of the in-door system is 0.25 W.

According to a GSM technical specification incorporated herein in its entirety, both base station transceiver and mobile stations can dynamically control power steps by desired SS and quality. Especially, SS is related to path loss, which means that SS is related to distance. When a mobile station is close to the antenna, the mobile station does not need to use the maximum output power for maintaining the connection and keeping it alive, and vice versa, therefore the power control algorithm will continually regulate the power during the call period. Similarly, base station transceiver is based on the same algorithm performing the same behavior.

A different class of mobile stations may have different power step definition, and the detailed technical specification of GMS, specifically its sections 05.05, 05.08, and 11.10, discuss it.

The system employs a frequency division duplex method known as FDD. It provides full duplex communications by the use of separate and equally large frequency bands for forward and reverse directions. A time division multiple access (TDMA) system is used to allocate a discrete amount of frequency bandwidth to each user in order to permit many simultaneous conversations, each caller being assigned a specific timeslot for transmission. In using TDMA, 10 timeslots are assigned for each frequency channel, and cellular phones (mobile stations) send bursts, or packets, of information during each timeslot. The receiving equipment reassembles packets of information into the original voice components. The type of modulation used in the system is GMSK—Gaussian Minimum Shift Keying, the type of encoding is RPE-LTP (Regular Pulse Excitation—Long-term Predictive Coding), and the system uses Frequency Hopping Multiple Access (FHMA). For channel code correction, cyclic codes, parity bit check, repetitional codes, and convolutional codes are employed. Sensitivity of the system can be best illustrated by handset sensitivity (about −104 dBm) allowed delay spread $Äô_{max}$ (16ìs), a bit/error rate, with no multipath Rayleigh fading in the clean room causing delay spread. Thus, using a base station installed at the plant with a plurality of low power antennas of the types described in the above allows, in accordance with the present invention, for achieving reliable communication in the circumstances of shielded areas at the plant.

Also located at the plant 12 is a private branch exchange 16. It can be, for example, of the Siemens Hicom 300 type. Depending on the real telecommunication demands of the plant, Hicom 300 versions such as Hicom 330H type, its capacity being 240–1392 ports, or Hicom 350H with 384–5760 ports can be selected. One of the characteristic features of Siemens Hicom 300H is its small overall dimensions, the PBX being 3–4 times less than other comparable switches; it also has surprisingly low power consumption, can work in any climatic zone, and does not require forced ventilation.

Connecting the base station 10 with a public switched telephone network 18 is a direct line 20 of the E1 type. It is a European equivalent of the North-American T1. E1 caries data at the rate of 2.048 megabit/s and is designed to carry 32 digital channels, of 64 Kb/s each, including one signaling channel and a channel for framing and maintenance. A similar direct E1 line 22 connects the public network 18 and the PBX 16.

A numbering plan for the switch 16 can be adopted by assigning, say, 1000 lines, e.g. 5000–5999 to plant users. Provided also are up to 125 sets of low power mobile stations 24 which are assigned four-digit numbers. These numbers may be within the same numbering plan 5000–5999, or beyond it. The mobile stations 24 communicate with the base station 10 using a plurality (up to 95) of low power antennas 26 equipped with associated equipment (not shown). Communication between the mobile stations 24 is carried out through the base station 10 with the use of the four-digit numbers assigned to the mobile stations.

Calls between the mobile stations 24 and users 26 of the PBX 16 are carried out through the E1 lines 20, 22. Since the E1 lines 20, 22 are dedicated ones, any call originating from a wireless mobile station 24 of the plant for intraplant communication to a wired station 26 goes from the base station 10 over the line 20 to a central office of the public network 18 and returns over the line 22 to the PBX 16. To reach a PBX's wired station 26, a user of the mobile station 24 at the plant conveniently dials the four-digit number within the 5000–5999 range assigned to the PBX 16. Software of the base station 10 provides for adding additional digits to the four-digit number—three for a number prefix defining a central office, whose portion—in terms of a numbering plan—the PBX 16 is, and three more, if necessary, for area code. Thus, a full unique full network number of a PBX's user, i.e. a wired station 26, is created, and the connection is thus being switched by the public network 18 and directed through the line 22 to the PBX 16 and the selected station 26.

In a similar way, a connection from a wired station 26 and a wireless mobile station 24 is set up through the E1 lines 20, 22. A call originating from a wired station 26 of the plant for intraplant communication to a wireless mobile station 24 goes from the PBX 16 over the line 22 to a central office of the public network 18 and returns over the line 20 to the base station 10. To reach a wireless mobile station 24, a user of the wired station 26 at the plant conveniently dials the four-digit number assigned to the mobile station. Software of the PBX 16 similarly provides for adding additional digits to the four-digit number to create a unique full network number of the mobile station 24. Using the number, the connection is thus being processed by the public network 18 and directed through the line 20 to the base station 10, and further—through the air—to the mobile station 24.

A connection between a wireless mobile station 24, or a wired station 26, and another subscriber 28 of the switched network 18, be it a wired or wireless station, is carried out in the way similar to that described in the above. The whole unique network number of a called subscriber is dialed and directed through the line 20, or 22, respectively, to the network 18, from which the call goes to the called subscriber in a regular way.

On the other hand, and it is an important feature of the system according to the present invention, the mobile station, whose user is currently outside the plant, can still be reached from the plant by dialing its abbreviated four-digit number. In this case, the four-digit number will be added by additional digits to create a unique full network number of the mobile station, and it will be reached like any other mobile station of the network with the use of roaming.

A connection between a subscriber of the switched network 18 and a wireless mobile station 24, or a wired station 26, is carried out in the opposite way. The whole unique network number of a called subscriber at the wireless mobile station 24 or wired station 26 is dialed and directed by the network 18 through the line 20, or 22, respectively, to the base station 10 or PBX 16, from which the call goes to the called subscriber in the above-described way. In this mode, any of the mobile stations 24 can leave the plant 12 and since it has a full unique network number assigned thereto, it is able to be connected to other wireless or wired stations at the plant by dialing their respective full number.

It is to be understood that the embodiments of the present invention that have been disclosed hereinabove are given by example only and not in a limiting sense. Those skilled in the art may make various modifications and additions to the preferred embodiments chosen to illustrate the invention without departing from the spirit and scope of the present contribution to the art. Specifically, it is believed that principles of the present invention are easily applicable to various types of communication equipment employed in the system claimed. Also, depending on real traffic, there can be provided more than one dedicated E1 line to and from the plant. Accordingly, it is to be realized that the patent protection sought and to be afforded hereby shall be deemed to extend to the subject matter claimed and all equivalence thereof fairly within the scope of the invention.

What is claimed is:

1. A business telecommunication system capable of connecting wireless mobile stations and wired stations located at a plant to avoid signal communication degradation with relatively higher signal reflecting areas within the plant, the system comprising:
 a base station to which said wireless mobile stations are connected, said base station being installed at said plant,
 a private branch exchange to which said wired stations are connected, said private branch exchange being installed at said plant,
 at least two dedicated lines, at least one line of said at least two dedicated lines connecting said base station with a public switched telephone network, another at least one line of said at least two dedicated lines connecting said public switched telephone network with said private branch exchange wherein communication between the mobile stations and the wired stations is accomplished through the public switched telephone network,
 a plurality of antennas associated with said base station to connect said wireless mobile stations to said base station, and
 whereby a wireless communication signal multipath can be eliminated, and reliable communication can be attained in circumstances of communication with relatively higher signal reflecting areas at the plant,
 software means for creating a unique full network number for any of said wireless mobile and wired stations, whereby a connection between said wireless mobile stations and between one of said wireless mobile station and one of said wired stations, no matter whether said wireless mobile stations are at the plant at the moment of establishing the connection, can be set up by using their abbreviated intraplant numbers,
 wherein said software means are incorporated in said base station and said private branch exchange.

2. The system as claimed in claim 1, wherein said antennas are low power antennas.

3. The system as claimed in claim 1, wherein said at least two dedicated lines are of E1 type.

4. The system as claimed in claim 1, wherein said base station is a Global System Mobile base station.

5. The system as claimed in claim 4, wherein said base station employs frequency division duplex and time division multiple access with dynamically controlled transmitting power.

6. The system as claimed in claim 1, wherein said private branch exchange comprises greater than about 240 communication ports.

7. A telecommunication system capable of connecting wireless mobile stations and wired stations located at a semiconductor manufacturing plant under the circumstances of communication with relatively higher signal reflecting areas within said plant while avoiding communication signal degradation, the system comprising:
 a base station to which said wireless mobile stations are connected, said base station being installed at said plant,
 a private branch exchange to which said wired stations are connected, said private branch exchange being installed at said plant,
 at least two dedicated wired lines, at least one line of said at least two decayed wired lines connecting said base station with a public switched telephone network, another at least one line of said at least two dedicated wired lines connecting said public switched telephone network with said private branch exchange wherein communication between the mobile stations and the wired stations is accomplished through the public switched telephone network,
 a plurality of antennas associated with said base station to connect said wireless mobile stations to said base station,
 software means for creating a unique full network number for any of said wireless mobile and wired stations, whereby a connection between said wireless mobile stations and between one of said wireless mobile station and one of said wired stations is accomplished,
 whereby a wireless communication signal multipath can be eliminated, and reliable communication can be attained in circumstances of communication with relatively higher signal reflecting areas at the plant, and
 wherein said software means are incorporated in said base station and said private branch exchange.

8. The system as claimed in claim 7, wherein said antennas are low power antennas.

9. The system as claimed in claim 7, wherein said at least two dedicated wired lines are of E1 type.

10. The system as claimed in claim 7, wherein said base station is a Global System Mobile base station.

11. The system as claimed in claim 10, wherein said base station employs frequency division duplex and time division multiple access with dynamically controlled transmitting power.

12. The system as claimed in claim 7, wherein said private branch exchange comprises greater than about 240 communication ports.

13. A telecommunication system capable of connecting wireless mobile stations and wired stations located at a semiconductor manufacturing plant under the circumstances of communication with relatively higher signal reflecting areas within said plant while avoiding communication signal degradation, the system comprising:
 a base station to which said wireless mobile stations are connected, said base station being installed at said plant,
 a private branch exchange to which said wired stations are connected, said private branch exchange being installed at said plant,
 at least two dedicated lines, at least one line of said at least two dedicated lines connecting said base station with a public switched telephone network, another at least one line of said at least two dedicated lines connecting said public switched telephone network with said private branch exchange wherein communication between the mobile stations and the wired stations is accomplished through the public switched telephone network,
 a plurality of low power antennas associated with said base station to connect said wireless mobile stations to said base station,
 software means for creating a unique full network number for any of said wireless mobile and wired stations,
 whereby a wireless communication signal multipath can be eliminated, and reliable communication can be attained in circumstances of communication with relatively higher signal reflecting areas at the plant,
 whereby a connection between said wireless mobile stations and between one of said wireless mobile station and one of said wired stations, no matter whether said wireless mobile stations are at the plant at the moment of establishing the connection, can be set up by using their abbreviated intraplant numbers, and wherein said software means are incorporated in said base station and said private branch exchange.

14. The system as claimed in claim 13, wherein said at least two dedicated lines are of E1 type.

15. The system as claimed in claim 13, wherein said base station is a Global System Mobile base station comprising frequency division duplex and time division multiple access with dynamically controlled transmitting power.

16. The system as claimed in claim 13, wherein said private branch comprises greater than about 240 communication ports.

* * * * *